United States Patent
Choi et al.

(10) Patent No.: US 10,344,228 B2
(45) Date of Patent: *Jul. 9, 2019

(54) SUPERCRITICAL WATER UPGRADING PROCESS TO PRODUCE HIGH GRADE COKE

(71) Applicant: Saudi Arabian Oil Company, Dhahran (SA)

(72) Inventors: Ki-Hyouk Choi, Dhahran (SA); Mohammad A. AlAbdullah, Dhahran (SA); Emad N. Al-Shafei, Dhahran (SA); Massad S. Alanzi, Dhahran (SA); Bandar K. Alotaibi, Dhahran (SA); Bandar Hussain Alsolami, Dhahran (SA); Ali M. Alsomali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,983

(22) Filed: Jul. 31, 2018

(65) Prior Publication Data

US 2018/0334619 A1  Nov. 22, 2018

Related U.S. Application Data

(63) Continuation of application No. 15/374,295, filed on Dec. 9, 2016, now Pat. No. 10,066,176.

(Continued)

(51) Int. Cl.
*C10G 69/06* (2006.01)
*C10G 49/18* (2006.01)
(Continued)

(52) U.S. Cl.
CPC .......... *C10G 69/06* (2013.01); *B01D 11/0403* (2013.01); *B01D 11/0415* (2013.01);
(Continued)

(58) Field of Classification Search
CPC ........ C10G 31/08; C10G 45/26; C10G 49/18; C10G 67/0454–67/049; C10G 69/06
See application file for complete search history.

(56) References Cited

U.S. PATENT DOCUMENTS 3,909,208 A   9/1975 Boret et al.
4,465,888 A   8/1984 Paspek, Jr.
(Continued)

FOREIGN PATENT DOCUMENTS

CA   2938409 A1   8/2015
CN   103180415 A   6/2013
(Continued)

OTHER PUBLICATIONS

Abdulrazak et al., "Problems of Heavy Oil Transportation in Pipelines and Reduction of High Viscosity", Iraqi Journal of Chemical and Petroleum Engineering, 2015, vol. 16, No. 3, 1-9.

(Continued)

*Primary Examiner* — Renee Robinson
(74) *Attorney, Agent, or Firm* — Dinsmore & Shohl (57) ABSTRACT

Embodiments of a process for producing high grade coke from crude oil residue include at least partially separating, in a solvent extraction unit, the crude oil residue into a deasphalted oil (DAO)-containing stream and an asphaltene containing-stream, producing a pressurized, heated DAO-containing stream, where the pressurized, heated DAO-containing stream, mixing a supercritical water stream with the pressurized, heated DAO-containing stream to create a combined feed stream, introducing the combined feed stream to an upgrading reactor system operating at supercritical temperature and pressure to yield one or more upgrading reactor output streams comprising upgraded product and a slurry mixture, where the slurry mixture comprises sulfur and one or more additional metals. The process also may include calcining the slurry mixture at a (Continued)

temperature of from 700° C. to 1900° C. to produce a product stream comprising the high grade coke.

20 Claims, 6 Drawing Sheets

Related U.S. Application Data (60) Provisional application No. 62/267,404, filed on Dec. 15, 2015.

(51) Int. Cl.

| | | |
|---|---|---|
| C10G 45/26 | (2006.01) | |
| C10G 67/04 | (2006.01) | |
| C10B 55/00 | (2006.01) | |
| C10B 57/04 | (2006.01) | |
| C10B 57/06 | (2006.01) | |
| B01D 11/04 | (2006.01) | |
| B01J 3/00 | (2006.01) | |
| C10G 31/06 | (2006.01) | |
| C10G 31/08 | (2006.01) | |
| C10G 31/10 | (2006.01) | |
| C10G 47/32 | (2006.01) | |
| C10G 49/00 | (2006.01) | |
| C10G 55/04 | (2006.01) | |
| C10G 9/00 | (2006.01) | |
| C10G 21/00 | (2006.01) | |
| C10G 21/14 | (2006.01) | |
| C10L 5/00 | (2006.01) | |
| C10L 9/08 | (2006.01) | |

(52) U.S. Cl.
CPC ........... *B01D 11/0488* (2013.01); *B01J 3/008* (2013.01); *C10B 55/00* (2013.01); *C10B 57/045* (2013.01); *C10B 57/06* (2013.01); *C10G 9/005* (2013.01); *C10G 21/003* (2013.01); *C10G 21/14* (2013.01); *C10G 31/06* (2013.01); *C10G 31/08* (2013.01); *C10G 31/10* (2013.01); *C10G 45/26* (2013.01); *C10G 47/32* (2013.01); *C10G 49/007* (2013.01); *C10G 49/18* (2013.01); *C10G 55/04* (2013.01); *C10G 67/0454* (2013.01); *C10L 5/00* (2013.01); *C10L 9/08* (2013.01); *C10G 2300/107* (2013.01); *C10G 2300/1074* (2013.01); *C10G 2300/1077* (2013.01); *C10G 2300/202* (2013.01); *C10G 2300/206* (2013.01); *C10G 2300/4006* (2013.01); *C10G 2300/4012* (2013.01); *C10G 2300/42* (2013.01)

(56) References Cited

U.S. PATENT DOCUMENTS

| | | | |
|---|---|---|---|
| 4,591,426 | A | 5/1986 | Krasuk et al. |
| 4,822,497 | A | 4/1989 | Hong et al. |
| 5,387,398 | A | 2/1995 | Mueggenburg et al. |
| 5,454,950 | A | 10/1995 | Li et al. |
| 6,039,791 | A | 3/2000 | Kazeef et al. |
| 6,299,759 | B1 | 10/2001 | Bradway et al. |
| 6,306,287 | B1 | 10/2001 | Billon et al. |
| 6,332,975 | B1 | 12/2001 | Abdel-Halim et al. |
| 6,365,790 | B2 | 4/2002 | Reimer et al. |
| 7,041,707 | B2 | 5/2006 | Hahn |
| 7,435,330 | B2 | 10/2008 | Hokari et al. |
| 7,591,983 | B2 | 9/2009 | Takahashi et al. |
| 7,594,387 | B2 | 9/2009 | Inage et al. |
| 7,740,065 | B2 | 6/2010 | Choi |
| 9,382,485 | B2 | 7/2016 | Choi et al. |
| 2006/0260927 | A1 | 11/2006 | Abazajian |
| 2008/0099374 | A1 | 5/2008 | He et al. |
| 2008/0099376 | A1 | 5/2008 | He et al. |
| 2008/0099378 | A1 | 5/2008 | He et al. |
| 2009/0139902 | A1 | 6/2009 | Ressmann et al. |
| 2009/0159489 | A1 | 6/2009 | Lopez et al. |
| 2009/0159498 | A1 | 6/2009 | Chinn et al. |
| 2009/0159504 | A1 | 6/2009 | Choi et al. |
| 2009/0166262 | A1 | 7/2009 | He et al. |
| 2011/0147266 | A1 | 6/2011 | Choi |
| 2012/0061291 | A1 | 3/2012 | Choi et al. |
| 2012/0061294 | A1 | 3/2012 | Choi et al. |
| 2012/0181217 | A1 | 7/2012 | Choi et al. |
| 2013/0140214 | A1 | 6/2013 | Choi |
| 2013/0319910 | A1 | 12/2013 | Koseoglu et al. |
| 2014/0135540 | A1 | 5/2014 | Iversen |
| 2014/0251871 | A1 | 9/2014 | Choi et al. |
| 2014/0275676 | A1 | 9/2014 | Sieli et al. |
| 2015/0258517 | A1 | 9/2015 | Degaleesan et al. |
| 2015/0321975 | A1 | 11/2015 | Choi et al. |
| 2016/0312129 | A1 | 10/2016 | Choi et al. |

FOREIGN PATENT DOCUMENTS

| | | |
|---|---|---|
| EP | 1342771 A1 | 9/2003 |
| EP | 1616931 A1 | 1/2006 |
| EP | 1696019 A1 | 8/2006 |
| GB | 1298904 A | 12/1972 |
| JP | 2000109850 A | 4/2000 |
| JP | 2003049180 A | 2/2003 |
| KR | 100249496 B1 | 12/1999 |
| WO | 2008055152 A1 | 5/2008 |
| WO | 2013033301 A2 | 3/2013 |
| WO | 2015094948 A1 | 6/2015 |

OTHER PUBLICATIONS

Ates et al., "The Role of Catalyst in Supercritical Water Desulfurization", Applied Catalysis B: Environmental, 2014, 147, 144-155, Elsevier B.V.

Badger et al., "Viscosity Reduction in Extra Heavy Crude Oils", 461-465, The Laboratory for Hydrocarbon Process Chemistry, The Pennsylvania State University.

Escallon, Maria M., "Petroleum and Petroleum/Coal Blends as Feedstocks in Laboratory-Scale and Pilot-Scale Cokers to Obtain Carbons of Potentially High Value", A Thesis in Fuel Science, 2008, The Pennsylvania State University Graduate School.

Gateau et al., "Heavy Oil Dilution", Oil & Gas Science and Technology, 2004, vol. 59, No. 5, 503-509.

Hughes et al., "Conocophillips Delayed Coking Process", Handbook of Petroleum Refining Processes, 2003, Chapter 12, 3rd Edition, 12.3-12.31, McGraw-Hill, New York (NY).

International Search Report and Written Opinion pertaining to PCT/US2016/066129 dated Mar. 13, 2017.

International Search Report and Written Opinion pertaining to PCT/US2016/066132 dated Mar. 21, 2017.

International Search Report and Written Opinion pertaining to PCT/US2016/066294 dated Mar. 21, 2017.

Iqbal et al., "Unlocking Current Refinery Constraints", PTQ Q2 2008, www.digitalrefining.com/article/1000682.

Kishita et al., "Desulfurization of Bitumen by Hydrothermal Upgrading Process in Supercritical Water with Alkali", Journal of the Japan Petroleum Institute, 2006, 49 (4), 1779-185.

International Search Report and Written Opinion pertaining to PCT/US2016/066367 dated Nov. 10, 2017.

Office Action pertaining to U.S. Appl. No. 15/374,295 dated Oct. 31, 2017.

Office Action pertaining to U.S. Appl. No. 15/374,203 dated Oct. 31, 2017.

Notice of Allowance pertaining to U.S. Appl. No. 15/377,351 dated Nov. 7, 2017.

International Search Report and Written Opinion pertaining to PCT International Application No. PCT/US2018/012027 filed Jan. 2, 2018.

(56) References Cited

OTHER PUBLICATIONS

Final Office Action pertaining to U.S. Appl. No. 15/374,295 dated Mar. 16, 2018.
Notice of Allowance pertaining to U.S. Appl. No. 15/374,203 dated Mar. 22, 2018.
International Search Report and Written Opinion dated Mar. 23, 2018 pertaining to PCT International Application No. PCT/US2017/068464 filed Dec. 27, 2017.
Office Action pertaining to U.S. Appl. No. 15/448,913 dated Nov. 13, 2018.
Chinese Office Action dated Jan. 30, 2019 pertaining to CN Application No. 201680077934.2.
Office Action pertaining to U.S. Appl. No. 15/840,519 dated Apr. 5, 2019.
Notice of Allowance and Fees(s) Due dated Apr. 9, 2019 pertaining to U.S. Appl. No. 15/448,913, filed Mar. 3, 2017, 11 pgs.
Office Action dated May 3, 2019 pertaining to U.S. Appl. No. 15/448,961, filed Mar. 3, 2017, 46 pgs.

SUPERCRITICAL WATER UPGRADING PROCESS TO PRODUCE HIGH GRADE COKE

CROSS-REFERENCE TO RELATED APPLICATIONS

This application is filed as a continuation of U.S. application Ser. No. 15/374,295 filed on Dec. 9, 2016, which claims priority to U.S. Provisional Application Ser. No. 62/267,404 filed Dec. 15, 2015.

TECHNICAL FIELD

Embodiments of the present disclosure generally relate to supercritical water upgrading processes, and more specifically relate to supercritical water upgrading processes for producing high grade coke.

BACKGROUND

Coke (often called petroleum coke or pet coke) is a carbonaceous solid produced in the oil refining process. Coking reactions follow free-radical mechanisms in which the breaking and formation of chemical bonds occur simultaneously. The most distinctive reactions are the dealkylation of aromatic compounds and the dehydrogenation of saturated compounds. Aromatization, dehydrogenative cyclization, and polymerization are also prevalent reactions.

The feedstock for coking processes is generally low economic value crude oil residue streams, such as vacuum residue or atmospheric residue. Although liquid product from the coking process needs further treatment steps, the simplicity of the coking process has attracted interest. Two major grades of coke are available in the market based on their quality: fuel grade coke, which contains a lot of impurities, such as sulfur and metals, and is often used in combustion applications to generate heat; and anode grade coke, which has fewer impurities than fuel-grade coke, and thus, is used in more applications, such as in the aluminum industry. Typical compositional properties of anode grade coke are shown in Table 1 as follows.

TABLE 1

| Component | Amount |
|---|---|
| Sulfur | <3.0 weight (wt) % |
| Volatile matter | <11.5 wt % |
| Vanadium | <250 wt parts per million (ppm) |
| Nickel | <150 wt ppm |
| Iron | <200 wt ppm |
| Calcium | <100 wt ppm |
| Sodium | <100 wt ppm |
| Silicon | <150 wt ppm |

For suitability in industrial applications, anode grade coke requires low metal content, low sulfur content, and high aromatic content. For these reasons, pre-treatment steps in upstream of delayed coker units and other coke production processes may be required. The pre-treatment methods can be classified into two groups: solvent extraction, and hydroprocessing.

In solvent extraction processes, for example, the ROSE® (Residuum Oil Supercritical Extraction) solvent extraction process developed by Kellogg Brown & Root, Inc a Solvent Deasphalting (SDA) process is utilized that separates a resin fraction from asphalthene. The resulting resin is directed to a delayed coker for generating high-end coke such as anode grade coke. While generating feedstock suitable for the production of high-end coke, the ROSE process demonstrates poor conversion of the vacuum residue and thereby is not an economically feasible anode coke producing process. Specifically, to reduce the metal content of the vacuum residue of Arabian heavy crude oil from 250 weight parts per million (wt ppm) to 9 wt ppm by the ROSE process, over 50% of vacuum residue is rejected as asphaltene pitch. Consequently, while the ROSE process can generate feedstock suitable for anode coke; the ROSE process is ineffective at producing upgraded petroleum, because it rejects so much of the vacuum residue and lacks chemical conversion function.

SUMMARY

Accordingly, ongoing needs exist for improved systems and methods for producing high grade coke, which encompasses anode grade coke and needle coke, from heavily contaminated residue oil. Needle coke refers to highly crystalline coking products that contain needle-like shards often used in the steel industry for manufacturing graphite electrodes. While needle coke and anode coke are both produced from calcined green coke, anode grade coke generally is considered lower quality than needle coke, which has a sulfur content from 0.1 weight % (wt %) to 0.6 wt %. The present embodiments utilize supercritical water to provide improved systems and methods for producing high grade coke, while also providing a new methodology for integrating supercritical water processes into conventional solvent deasphalting to produce a higher yield of coke and also generating upgraded petroleum.

In one embodiment, a process for producing high grade coke, such as anode grade coke, from crude oil residue is provided. The process comprises at least partially separating in a solvent extraction unit crude oil residue into a deasphalted oil (DAO)-containing stream and an asphaltene containing-stream, and producing a pressurized, heated DAO-containing stream by pressurizing and heating the DAO-containing stream at a temperature greater than 75° C. and a pressure greater than the critical pressure of water. The process further includes mixing a supercritical water stream with the pressurized, heated DAO-containing stream to create a combined feed stream, where the supercritical water stream has a pressure greater than the critical pressure of water and a temperature greater than the critical temperature of water, introducing the combined feed stream to an upgrading reactor system comprising one or more upgrading reactors operating at a temperature greater than the critical temperature of water and a pressure greater than the critical pressure of water to yield one or more upgrading reactor output streams comprising upgraded product and a slurry mixture, where the slurry mixture comprises sulfur and one or more additional metals, and calcining the slurry mixture at a temperature of from 700° C. to 1900° C. to produce a product stream comprising the high grade coke.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

DETAILED DESCRIPTION

Embodiments of the present disclosure are directed to systems for producing high grade coke from crude oil residue 105 through the utilization of supercritical water. As used throughout the disclosure, "supercritical" refers to a substance at a pressure and a temperature greater than that of its critical pressure and temperature, such that distinct phases do not exist and the substance may exhibit the diffusion of a gas while dissolving materials like a liquid. At a temperature and pressure greater than the critical temperature and pressure of water, the liquid and gas phase boundary disappears, and the fluid has characteristics of both fluid and gaseous substances. Supercritical water is able to dissolve organic compounds like an organic solvent and has excellent diffusibility like a gas. Regulation of the temperature and pressure allows for continuous "tuning" of the properties of the supercritical water to be more liquid or more gas like. Supercritical water has reduced density and lesser polarity, as compared to liquid-phase sub-critical water, thereby greatly extending the possible range of chemistry, which can be carried out in water.

Without being bound by theory, supercritical water has various unexpected properties as it reaches supercritical boundaries. Supercritical water has very high solubility toward organic compounds and has an infinite miscibility with gases. Furthermore, radical species can be stabilized by supercritical water through the cage effect (that is, a condition whereby one or more water molecules surrounds the radical species, which then prevents the radical species from interacting). The stabilization of radical species may help prevent inter-radical condensation and thereby reduces the overall coke production in the current embodiments. For example, coke production can be the result of the inter-radical condensation. In certain embodiments, supercritical water generates hydrogen gas through a steam reforming reaction and water-gas shift reaction, which is then available for the upgrading reactions.

Supercritical water has various unexpected properties as it reaches its supercritical boundaries of temperature and pressure. For instance, supercritical water may have a density of 0.123 grams per milliliter (g/mL) at 27 megapascals (MPa) and 450° C. In comparison, if the pressure was reduced to produce superheated steam, for example, at 20 MPa and 450° C., the steam would have a density of only 0.079 g/mL. Without being bound by theory, fluids having a closer density to hydrocarbons may have better dissolution power. Additionally, at that density, the hydrocarbons may react with superheated steam to evaporate and mix into the liquid phase, leaving behind a heavy fraction that may generate coke upon heating. The formation of coke or coke precursor may plug the lines and must be removed. Therefore, supercritical water is superior to steam in some applications.

As mentioned, embodiments of the present disclosure are directed to systems for producing high grade coke from crude oil residue 105 through the utilization of supercritical water. Crude oil residue may include atmospheric residue (AR), vacuum gas oil (VGO), or vacuum residue (VR). In one or more embodiments, the crude oil residue 105 may be a residue of heavy crude oil, such as Arab Heavy crude oil.

Various compositions are contemplated for the crude oil residue 105. In one or more embodiments, the crude oil residue 105 may be produced from the atmospheric distillation or vacuum distillation of crude oil. From a density standpoint, the crude oil residue 105 may have an American Petroleum Institute (API) Gravity value of less than 27° API, or less than 19° API. Compositionally, the crude oil residue 105 may have a sulfur content of 1.0 weight % (wt %) to 7.0 wt %, or 3.0 wt % to 6.0 wt %. Moreover, the crude oil residue 105 may contain heavy metals such as nickel and vanadium in an amount up to 500 wt ppm or less. In one or more embodiments, the crude oil residue 105 may include 2 wt ppm to 80 wt ppm, or 6 wt ppm to 65 wt ppm of nickel. Further, the crude oil residue 105 may include 10 wt ppm to 250 wt ppm, or 15 wt ppm to 200 wt ppm of vanadium. Moreover, the crude oil residue 105 may include 3 wt % to 40 wt %, or 5 wt % to 30 wt % of Conradson Carbon Residue (CCR). In other embodiments, the crude oil residue 105 may include at least 5 wt % of $C_7$-asphaltene compounds.

Referring to the embodiments of FIGS. 1-6, the system 100 may involve feeding crude oil residue 105 to a solvent extraction unit 110 to at least partially separate the crude oil residue 105 into a deasphalted oil (DAO)-containing stream 114 and an asphaltene containing-stream 112. Various solvent extraction units are contemplated. In one embodiment, the solvent extraction unit 110 comprises one or more deasphalting units. Various solvents are contemplated for the solvent extraction unit 110. In one or more embodiments, the solvent is selected from light paraffins, for example, one or more paraffins selected from $C_3$-$C_7$ paraffins.

The DAO-containing stream 114 has a higher hydrogen/carbon (H/C) ratio and a higher oxygen content than the asphaltene containing-stream 112 which thereby provides higher polarity to the DAO-containing stream 114. Also, the contents of heteroatoms in the DAO-containing stream 114, such as sulfur are less than asphaltene. In some embodiments, the DAO-containing stream 114 may have a H/C ratio of greater than or equal to 1.1, such as greater than or equal to 1.2, greater than or equal to 1.4, greater than or equal to 1.6, or greater or equal to than 1.8. The DAO-containing stream 114 may have a H/C ratio of from 1.1 to 2, or from 1.2 to 2, or from 1.4 to 2, or from 1.5 to 2, or from 1.6 to 2 or from 1.8 to 2. Without being bound by any particular theory, the high polarity of the DAO-containing stream 114 may be attributed to the presence of a resin fraction in the DAO-containing stream 114. The high polarity may allow the DAO-containing stream 114 to reject asphaltene but not resin, which may be used as a seed to produce feedstock for a coker.

For example and not by way of limitation, the DAO-containing stream 114 may include less than 5 wt % of sulfur compounds, less than 150 wt ppm of heavy metals such as nickel and vanadium, less than 10 wt % of CCR, and less than 3 wt % $C_7$-asphalthene compounds. In yet another embodiment, the DAO-containing stream 114 may include less than 4 wt % of sulfur compounds, less than 50 wt ppm of heavy metals, less than 8 wt % of CCR, and less than 2 wt % of $C_7$-asphalthene compounds. Moreover, the aromatic content of the DAO-containing stream 114 is less than that of the crude oil residue 105 feed and also less than the asphaltene containing-stream 112. For example, the aromatic content of the DAO-containing stream 114 may be less than 30 wt % or less than 25 wt %. Without being bound by any particular theory, aromatics in asphaltene may be bonded to impurities, such as sulfur and metals. Thus, having a low aromatic content in the DAO-containing stream 114 may be a sign of asphaltene separation and a lack of impurities present in the DAO-containing stream 114.

As shown in FIGS. 1-6, the DAO-containing stream 114 may be pressurized in a pump 116 to create a pressurized DAO-containing stream 117. The pressure of the pressurized DAO-containing stream 117 may be at least 22.1 MPa, which is approximately the critical pressure of water. Alternatively, the pressure of the pressurized DAO-containing stream 117 may be between 22.1 MPa and 32 MPa, or between 23 MPa and 30 MPa, or between 24 MPa and 28 MPa. In some embodiments, the pressure may be between 25 MPa and 29 MPa, 26 MPa and 28 MPa, 25 MPa and 30 MPa, 26 MPa and 29 MPa, or 23 MPa and 28 MPa.

Referring again to FIGS. 1-6, the pressurized DAO-containing stream 117 may then be heated in one or more DAO pre-heaters 120 to form a pressurized, heated DAO-containing stream 126. In one embodiment, the pressurized, heated DAO-containing stream 126 has a pressure greater than the critical pressure of water as described previously and a temperature greater than 75° C. Alternatively, the temperature of the pressurized, heated DAO-containing stream 126 is between 10° C. and 300° C., or between 50° C. and 250° C., or between 75 and 200° C., or between 50° C. and 150° C., or between 50° C. and 100° C., or between 100° C. and 200° C., or between 150° C. and 250° C., or between 200° C. and 300° C. In some embodiments, the temperature may be between 75° C. and 225° C., or between 100° C. and 250° C., or between 125° C. and 175° C., or between 140° C. and 160° C.

Embodiments of the DAO pre-heaters 120 may include a natural gas fired heater, heat exchanger, or an electric heater. In some embodiments, the pressurized DAO-containing stream 117 is heated in a double pipe heat exchanger.

Figure 1:
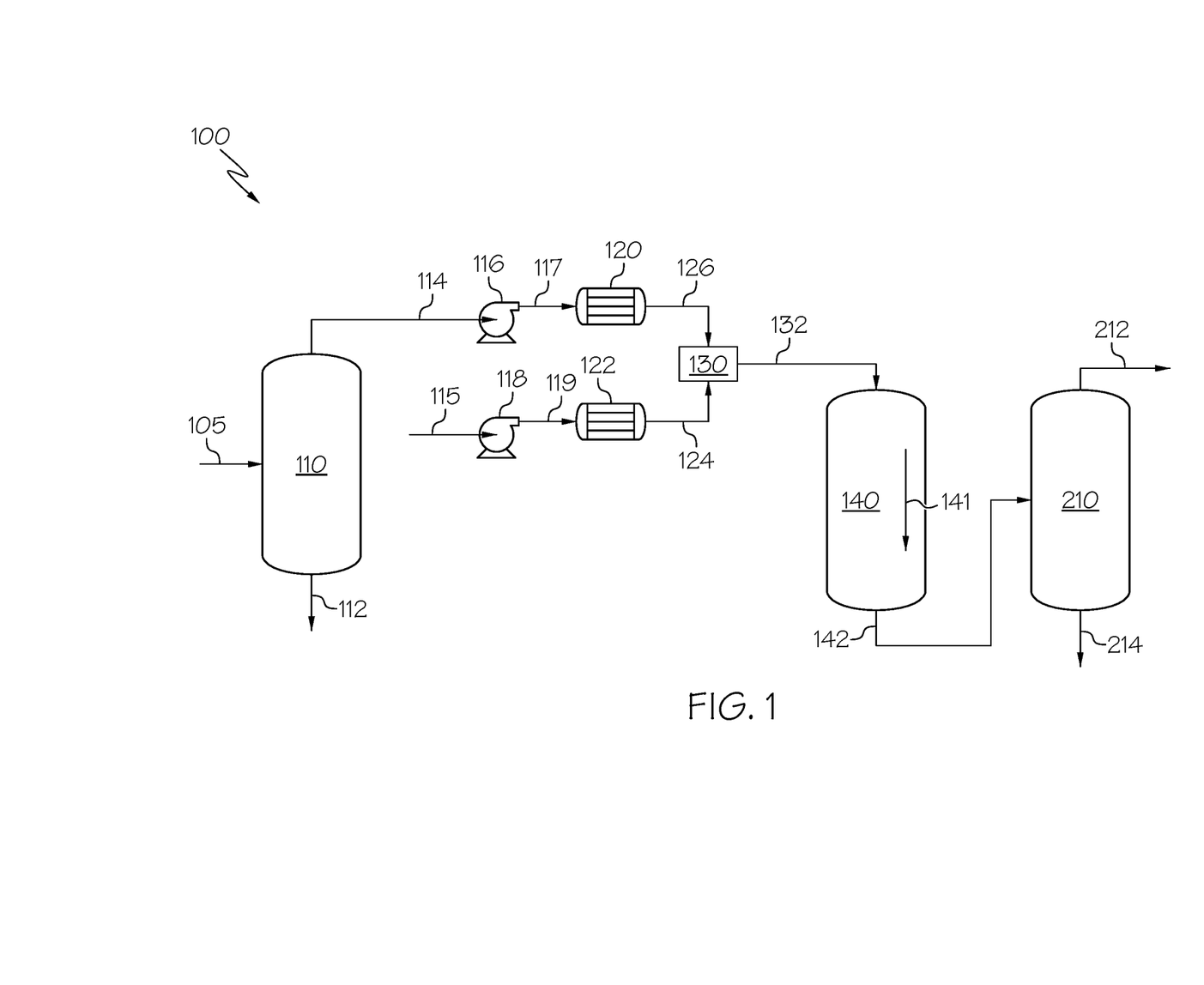
FIG. 1 is a schematic illustration of a system for producing high grade coke using supercritical water upgrading in accordance with one or more embodiments of the present disclosure.

As shown in FIGS. 1-6, the supercritical water stream 124 may be produced from any suitable water stream 115. The water stream 115 may be any source of water, for example, a water stream having a conductivity less than 1 microsiemens/centimeters (μs/cm), such as less than 0.5 μs/cm or less than 0.1 μs/cm. Exemplary water streams 115 include demineralized water, distillated water, boiler feed water (BFW), and deionized water. In at least one embodiment, the water stream 115 is a boiler feed water stream. As shown in FIG. 1, the water stream 115 is pressurized by pump 118 to produce a pressurized water stream 119. The pressure of the pressurized water stream 119 is at least 22.1 MPa, which is approximately the critical pressure of water. Alternatively, the pressure of the pressurized water stream 119 may be between 22.1 MPa and 32 MPa, or between 22.9 MPa and 31.1 MPa, or between 23 MPa and 30 MPa, or between 24 MPa and 28 MPa. In some embodiments, the pressure may be 25 MPa and 29 MPa, 26 MPa and 28 MPa, 25 MPa and 30 MPa, 26 MPa and 29 MPa, or 23 MPa and 28 MPa.

Referring again to FIGS. 1-6, the pressurized water stream 119 may then be heated in the water pre-heater 122 to create a supercritical water stream 124. The temperature of the supercritical water stream 124 is greater than about 374° C., which is approximately the critical temperature of water. Alternatively, the temperature of the supercritical water stream 124 may be between 374° C. and 600° C., or between 400° C. and 550° C., or between 400° C. and 500° C., or between 400° C. and 450° C., or between 450° C. and 500° C. In some embodiments, the maximum temperature of the supercritical water stream 124 may be 600° C., as the mechanical parts in the supercritical reactor system may be affected by temperatures greater than 600° C.

Similar to the DAO pre-heater 120, suitable water pre-heaters 122 may include a natural gas fired heater, a heat exchanger, and an electric heater. The water pre-heater 122 may be a unit separate and independent from the DAO pre-heater 120.

Referring again to FIGS. 1-6, the supercritical water stream 124 may be mixed with the pressurized, heated DAO-containing stream 126 in a mixer 130 to create a combined feed stream 132. The feed mixer 130 can be any type of mixing device capable of mixing the supercritical water stream 124 and the pressurized, heated DAO-containing stream 126. In one embodiment, feed mixer 130 may be a mixing tee, an ultrasonic mixer, a small continuous stir tank reactor (CSTR), a homogenizer, or any other suitable mixer. The volumetric flow ratio of supercritical water stream 124 and the pressurized, heated DAO-containing stream 126 fed to the feed mixer 130 may vary. In one embodiment, the volumetric flow ratio may be from 10:1 to 1:1, or 10:1 to 1:10, or 5:1 to 1:1, or 4:1 to 1:1 at standard ambient temperature and pressure (SATP).

Referring to FIG. 1, the combined feed stream 132 may pass to a system 100 comprising one or more upgrading reactors 140 operating at a temperature greater than the critical temperature of water and a pressure greater than the critical pressure of water to yield one or more upgrading reactor output streams 142 comprising upgraded product and a slurry mixture, where the slurry mixture comprises sulfur and one or more additional metals. The upgrading reactor system, whether it includes one or multiple upgrading reactors, as depicted in the various embodiments of the FIGS., employ supercritical water as the reaction medium for upgrading reactions in the absence of externally-provided hydrogen gas and in the absence of a catalyst. In certain optional embodiments, supercritical water generates hydrogen gas through a steam reforming reaction and water-gas shift reaction, which is then available for the upgrading reactions. In the embodiment of FIG. 1, the upgrading reactor 140 yields an upgrading reactor output stream 142 that includes both the upgraded product and the slurry mixture.

As stated, the upgrading reactor 140 may operate at a supercritical temperature and pressure. In one or more embodiments, the upgrading reactor 140 may have a temperature of between 450° C. to 550° C., or between 470° C. to 530° C. as measured at the inner wall of the reactor. The temperature of fluid in the reactor is between 380° C. and 450° C. or between 400° C. and 430° C. The upgrading reactor 140 may be an isothermal or nonisothermal reactor. The reactor may be a tubular-type vertical reactor, a tubular-type horizontal reactor, a vessel-type reactor, a tank-type reactor having an internal mixing device, such as an agitator, or a combination of any of these reactors. Moreover, additional components, such as a stirring rod or an agitation device may also be included in the upgrading reactor 140.

As discussed previously and as shown in the embodiment of FIGS. 1, 2, 4, and 6, the upgrading reactor system may include one upgrading reactor 140. The combined feed stream 132 is fed through an inlet port of the upgrading reactor 140. The upgrading reactor 140 depicted in FIG. 1 is a downflow reactor where the inlet port is disposed near the top of the upgrading reactor 140 and the outlet port is disposed near the bottom of the first upgrading reactor 140A. Alternatively, it is contemplated that the upgrading reactor 140 may be an upflow reactor where the inlet port is disposed near the bottom of the reactor. As shown by arrow 141, a downflow reactor is a reactor where the upgrading reactions occur as the reactants travel downward through the reactor. Conversely, an upflow reactor is a reactor where the petroleum upgrading reactions occur as the reactants travel upward through the reactor.

The upgrading reactor(s) 140 may have dimensions defined by the equation L/D, where L is a length of the upgrading reactor 140 and D is the diameter of the upgrading reactor 140. In one or more embodiments, the L/D value may be from 2.5 to 300, or from 20 to 100. Without being bound by theory, the reactor dimensions may impact the residence time within the reactors. As stated in prior paragraphs, this increased residence time may increase free-radical reactions which thereby increases coke formation. In one or more embodiments, the L/D value of the upgrading reactor(s) 140 may be sufficient to achieve a superficial velocity of fluid greater than 0.5 meter(m)/minute(min), or an L/D value sufficient to a achieve superficial velocity of fluid between 1 m/min and 25 m/min, or an L/D value sufficient to a achieve superficial velocity of fluid between 1 m/min and 5 m/min. The fluid flow may be defined by a Reynolds number greater than about 5000.

Figure 3:
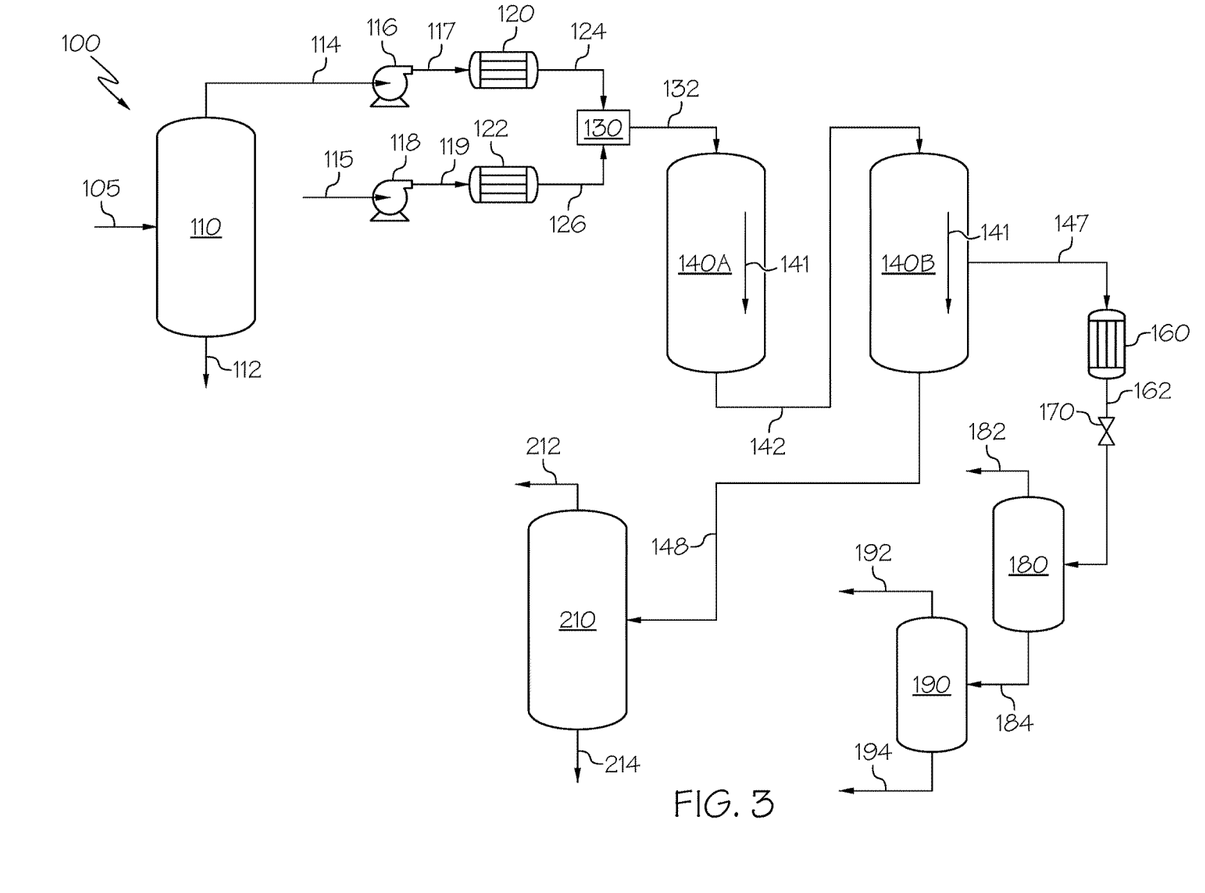
FIG. 3 is a schematic illustration of yet another system for producing high grade coke using a dual supercritical water reactor system in accordance with one or more embodiments of the present disclosure.
Figure 5:
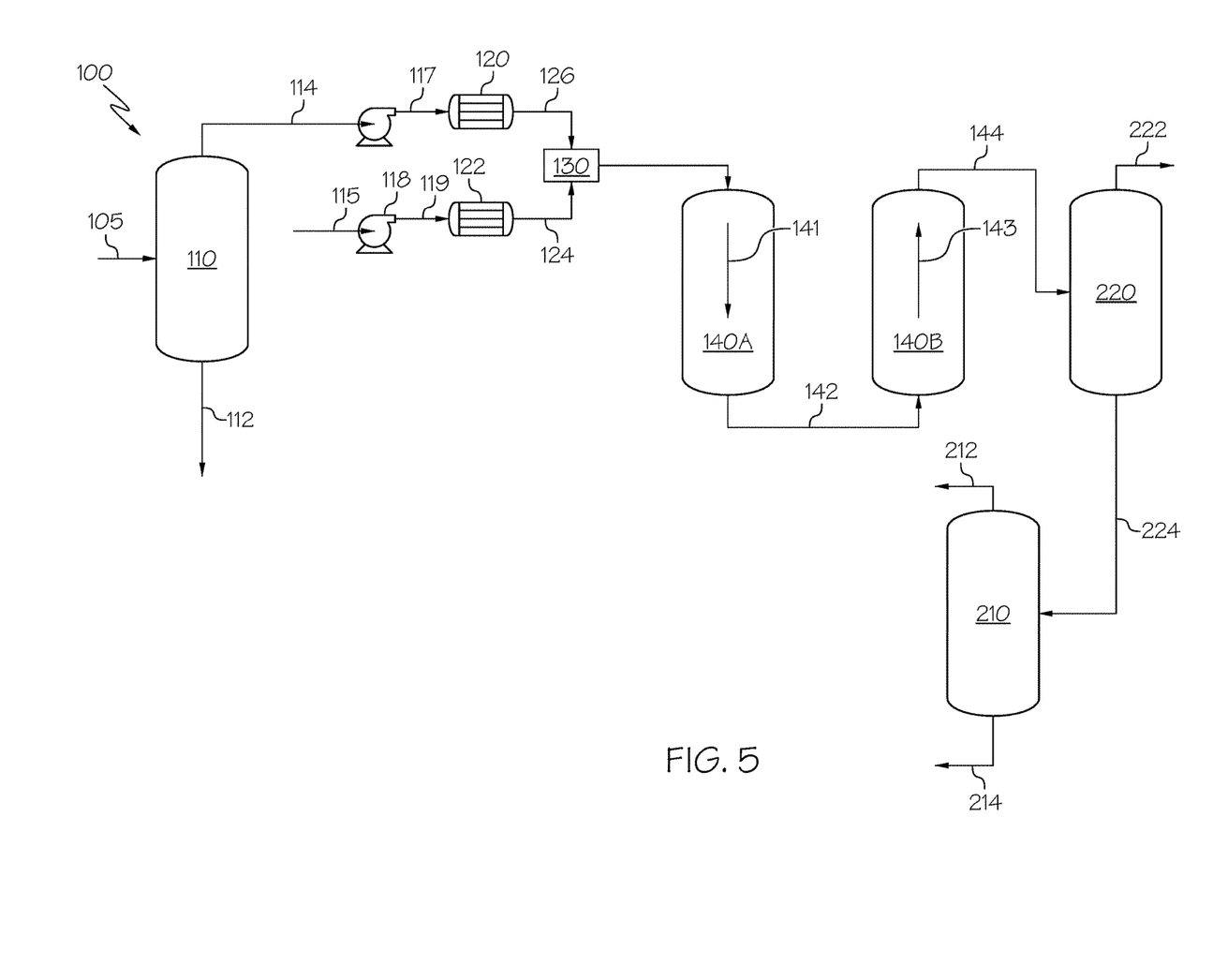
FIG. 5 is a schematic illustration of a system for producing high grade coke using supercritical water upgrading and a supercritical $CO_2$ separator in accordance with one or more embodiments of the present disclosure.

As shown in the embodiments of FIGS. 3 and 5, the upgrading reactor system may include two upgrading reactors: a first upgrading reactor 140A and a second upgrading reactor 140B. As discussed previously, the first upgrading reactor 140A and the second upgrading reactor 140B may be upflow or downflow upgrading reactors. As shown in FIG. 3, the first upgrading reactor 140A and the second upgrading reactor 140B may both be downflow reactors as indicated by downflow arrows 141. The embodiment of FIG. 5 shows a first upgrading reactor 140A, which is a downflow reactor, and a second upgrading reactor 140B, which is an upflow reactor as demonstrated by upflow arrow 143. Without being bound by theory, including additional upgrading reactors may increase the residence time in the first upgrading reactor 140A and the second upgrading reactor 140B may increase the formation of coke within the reactors. Whether using a single or multiple upgrading reactors, the residence time within the upgrading reactors may be from 10 seconds to 60 minutes (min), or 1 min to 30 mins. The residence time, in some embodiments, may be between 2 and 30 mins, or between 2 and 20 mins, or between 5 and 25 mins, or between 5 and 10 mins.

Referring to the embodiments of FIGS. 3 and 5, the second upgrading reactor 140B may have a volume greater than, less than, or equal to a volume of the first upgrading reactor 140A. In one or more embodiments, a ratio of the volume of the first upgrading reactor 140A to the volume of the second upgrading reactor 140B is from 0.1:1 to 1:1, or from 0.5:1 to 1:1. The volume of the first upgrading reactor 140A and the volume of the second upgrading reactor 140B may be adjusted based on the desired application. For instance, without being bound by any particular theory, having a first upgrading reactor 140A with a greater volume than the second upgrading reactor 140B may allow for a longer residence time and lower temperature in the first upgrading reactor 140A, allowing for a more mild upgrading process in the first upgrading reactor 140A. The second upgrading reactor 140B with a shorter residence time and higher temperature would allow for a deeper upgrading and could produce a DAO-containing stream 114 with a higher density (such as having an API of less than or equal to 15°) and a lower miscibility with water. Alternatively, having a first upgrading reactor 140A with a lesser volume than the second upgrading reactor 140B may create a smaller, hotter temperature mixing process in the first upgrading reactor 140A with a larger, colder process in the second upgrading reactor 140B to refine the DAO-containing stream 114. This process may produce a lower density DAO-containing stream 114 (such as having an API of greater than or equal to 15°).

Figure 2:
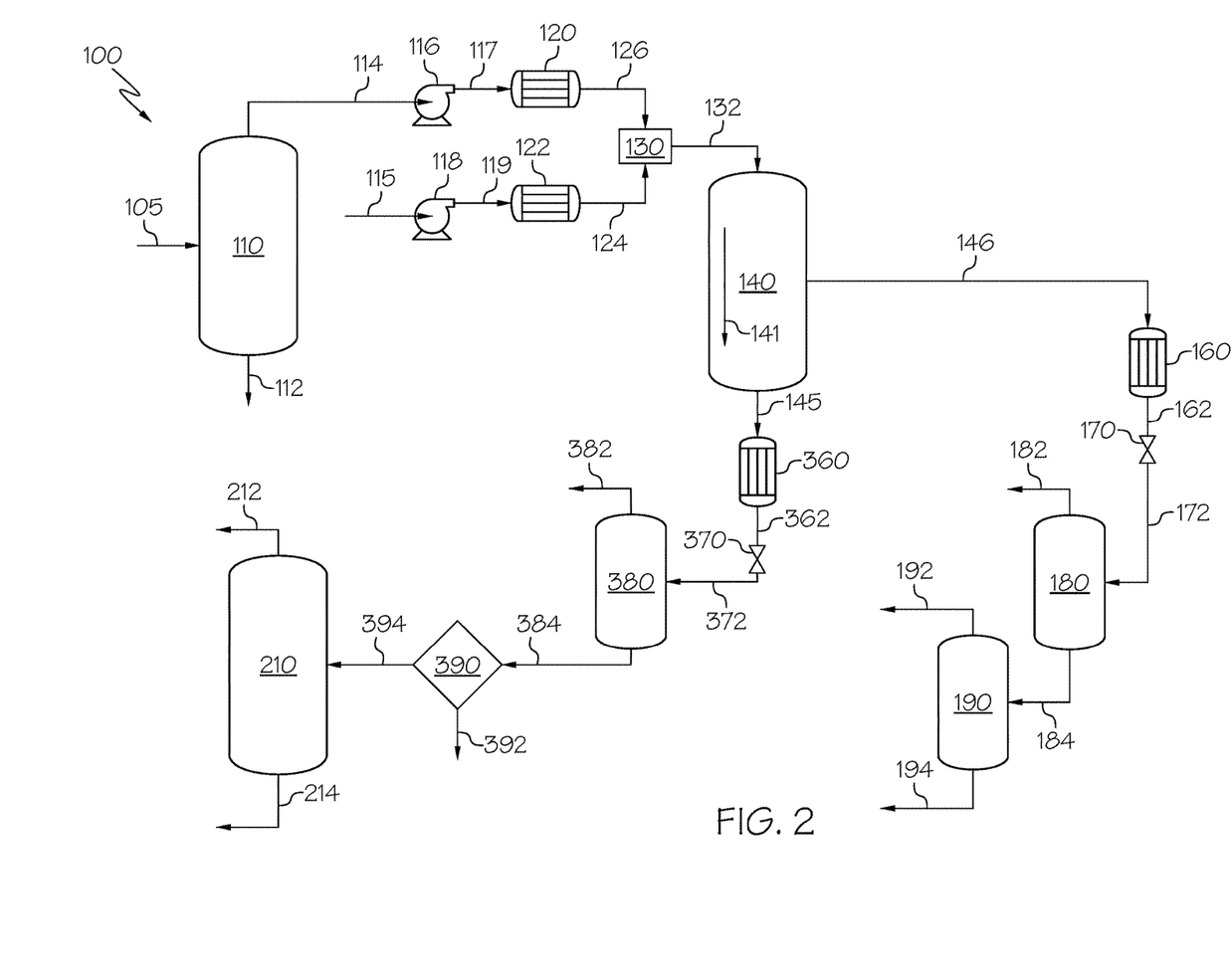
FIG. 2 is a schematic illustration of another system for producing high grade coke using supercritical water upgrading in accordance with one or more embodiments of the present disclosure.

As shown in FIGS. 1 and 4-6, the upgrading reactors (140, 140A, or 140B) may have one inlet port and one outlet port. However, in the single upgrading reactor embodiment of FIG. 2, the upgrading reactor 140 may be a downflow reactor comprising an upper inlet port, a lower outlet port, and a middle outlet port disposed between the upper inlet port and lower outlet port. As shown in FIG. 2, the upgrading reactor 140 may transfer a slurry mixture 145 out of the bottom port while an upgraded product stream 146, which is a gas-liquid-oil stream, is transferred out of the middle port of the upgrading reactor 140. Similarly, in the two upgrading reactor system of FIG. 3, the second upgrading reactor 140B may be a downflow reactor comprising an upper inlet port, a lower outlet port, and a middle outlet port disposed between the upper inlet port and the lower outlet port. The second upgrading reactor 140B may transfer a slurry mixture 148 out of the bottom port while an upgraded product stream 147, which is a gas-liquid oil-water stream, is transferred out of the middle port of the second upgrading reactor 140B.

Regardless of whether the slurry mixture is separated from the upgraded product in the upgrading reactors or in downstream separators as described in the following paragraphs, the slurry mixture may include the following composition after excluding water and gas, which typically is present in minor amounts of, less than 1 wt %. For example and not by way of limitation, the slurry mixture 148 may include less than 3 wt % of sulfur compounds, less than 150 wt ppm of heavy metals such as nickel and vanadium, and an aromatic content of at least 30 wt %. Referring to FIG. 3 for example, the slurry mixture 148 may have less sulfur content than the gas-liquid-oil upgraded product stream 147, as well as a lesser H/C ratio than the upgraded product stream 147. For example, the slurry mixture may have an H/C ratio less than 1.0, or less than 0.8. In further contrast, the gas-liquid-oil stream 147 has less aromatic content than slurry mixture 148. Due to this higher aromatic content, the slurry mixture 148 may be readily converted into coke by the calciner 210 as described in the following paragraphs. In addition to the compositional details, it is worth noting that the slurry mixture 148 may have a melting point less than 350° C., thus the slurry mixture is in its melted phase in supercritical water.

Referring again to FIG. 1, the output stream 142 of the upgrading reactor may then be fed to a calciner 210. Various calciner units are contemplated as suitable, for example a rotary kiln. In the calciner 210, the output stream 142 is calcined at a temperature of from 700° C. to 1900° C. to produce a high grade coke product stream 214 comprising high grade coke which is transferred out of the bottom port of the calciner 210. The calcination step may occur in an inert atmosphere, for example, an atmosphere comprising nitrogen, argon, or helium. In some embodiments, the calciner 210 may operate at a temperature from 1000° C. to 1300° C. In some embodiments, the calciner 210 may operate at a temperature of from 1000° C. to 1200° C., or from 800° C. to 1300° C., or from 1000° C. to 1900° C. Additionally, the calcined upgraded product 212, which is a gas-liquid oil stream, is transferred out of a top port of the calciner 210. The high grade coke product stream 214 may have a composition as listed in Table 1.

Referring to the embodiment of FIGS. 2, and 4-6, additional reaction steps may be performed upstream of the calciner 210. Referring to FIG. 2, the slurry mixture 145 exiting upgrading reactor 140 may be cooled, depressurized, degassed and dewatered prior to being delivered to the calciner 210. Specifically as shown in FIG. 2, the slurry mixture 145 is passed to a cooler unit 360 to produce a cooled slurry mixture 362 having a temperature less than 200° C. The cooled slurry mixture 362 is then depressurized by a depressurization unit, for example, valve 370 to produce a cooled, depressurized slurry mixture 372 having a pressure from 0.05 MPa to 2.2 MPa. The cooled, depressurized slurry mixture 372 may then be passed to a gas-liquid separator 380 to separate the cooled, depressurized slurry mixture 372 into a gas-phase stream 382, which is passed out of the top of the gas-liquid separator 380, and a liquid-phase slurry stream 384 The liquid-phase slurry stream 384 may then be fed to a centrifuge 390 to remove water 392 and produce a dried slurry mixture 394, which may then be fed to a calciner 210. The dried slurry mixture 394 comprises coke precursor. Coke precursor amounts in the dried slurry mixture 394 may depend upon reactor operating conditions such as temperature and residence time. For continuous operation of the process, the content may be maintained below 5 wt %, or below 1 wt % in the slurry mixture 394.

Figure 4:
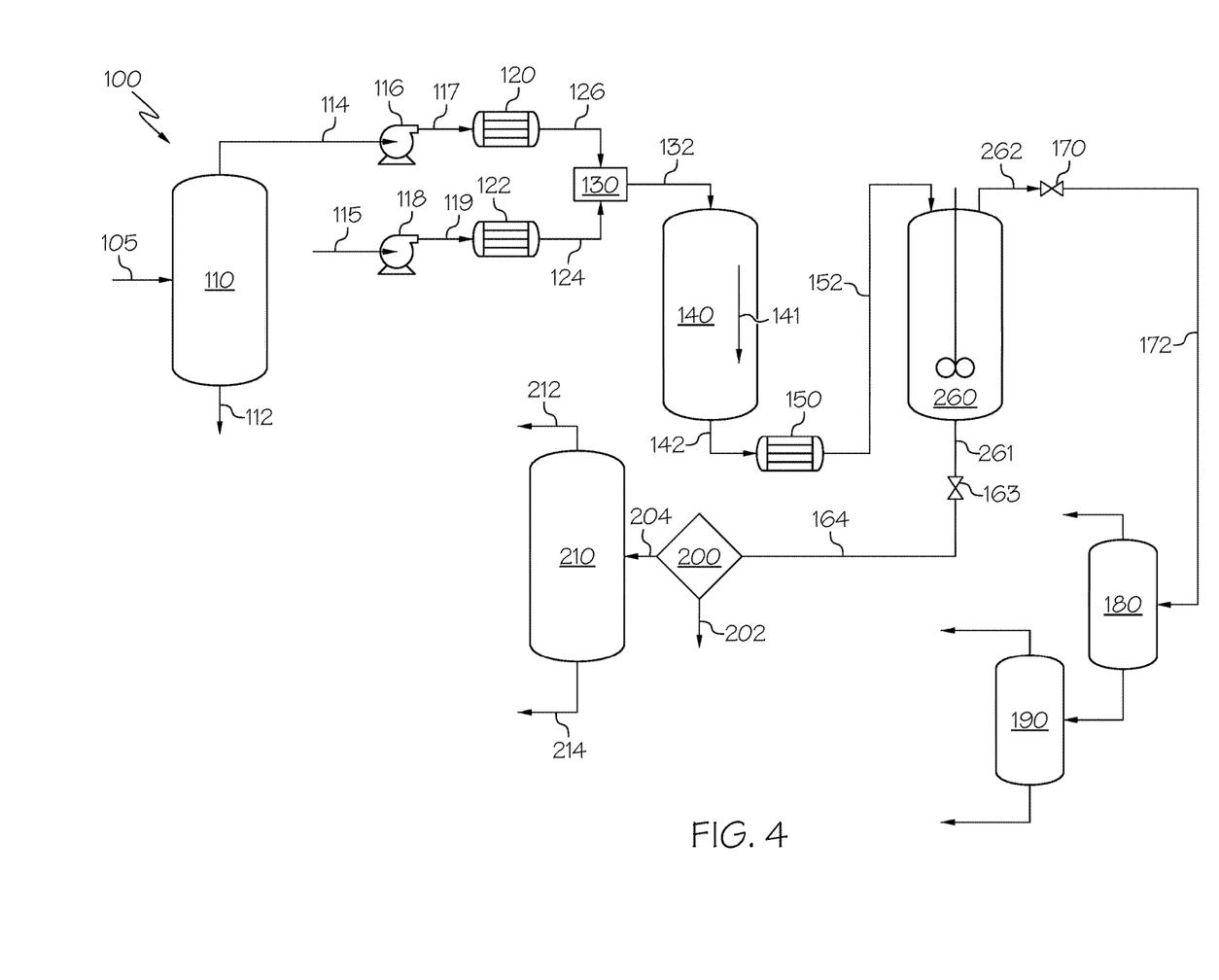
FIG. 4 is a schematic illustration of a system for producing high grade coke using supercritical water upgrading and a subcritical separator in accordance with one or more embodiments of the present disclosure.

Similarly as shown in FIG. 4, the output stream 142 may be cooled in a cooling unit 150 (for example, a heat exchanger) to produce cooled output stream 152. The temperature of the cooled output stream 152 may be cooled to less than about 200° C. The cooled output stream 152 may then be transferred to a subcritical separator 260 upstream of the calciner 210. The subcritical separator 260 may include any suitable two-phase separator vessel. In one embodiment, the subcritical separator 260 may be a continuous stirred tank reactor, which passes an upgraded product stream 262 out of the top of the subcritical separator 260 and passes a slurry mixture stream 261 out of the bottom of the subcritical separator 260. Various operating parameters are contemplated for the subcritical separator 260. In one or more embodiments, the temperature is from 100° C. to 350° C. The pressure is maintained to be higher than the steam pressure at the specific separator temperature in order to prevent vaporization of water. The residence time within the subcritical separator 260 may vary, for example, from 1 min to 120 mins, or 30 mins to 60 mins. The residence time, in some embodiments, may be between 60 and 120 mins, or between 90 and 120 mins, or between 30 and 60 mins, or between 30 and 90 mins. In some embodiments, the residence time may be between 2 and 30 mins, or between 2 and 20 mins, or between 5 and 25 mins, or between 5 and 10 mins.

Referring again to FIG. 4, the slurry mixture stream 261 may be depressurized in a depressurization device 163, for example, a valve, to produce depressurized slurry mixture 164. In one or more embodiments, the depressurized slurry mixture 164 may have a pressure from 0.05 MPa to 2.2 MPa. Further as shown in FIG. 4, the depressurized slurry mixture 164 may be dried in a centrifuge 200 upstream of the calciner 210, where a water stream 202 is removed from the depressurized slurry mixture 164 to produce a dried slurry mixture 204, which is then passed to the calciner 210. While not shown, it is contemplated that dried slurry mixture 204 may be subjected to minor steps such as a separator to remove $CO_2$ before fed to calciner.

Referring to an alternative embodiment depicted in FIG. 5, the output stream 142 of the upgraded reactor system, which comprises upgraded gas-liquid-oil and slurry mixture, may be fed to a supercritical $CO_2$ extractor 220 upstream of the calciner 210. As shown, the supercritical $CO_2$ extractor 220 may separate the output stream 144 of the second upgrading reactor 140B, such that the upgraded gas-liquid-oil stream 222 is passed out of the top of the supercritical $CO_2$ extractor 220 while the slurry mixture 224 is passed out of the bottom of the supercritical $CO_2$ extractor 220. The slurry mixture 224 may then be delivered to the calciner 210 for production of high grade coke product stream 214.

Figure 6:
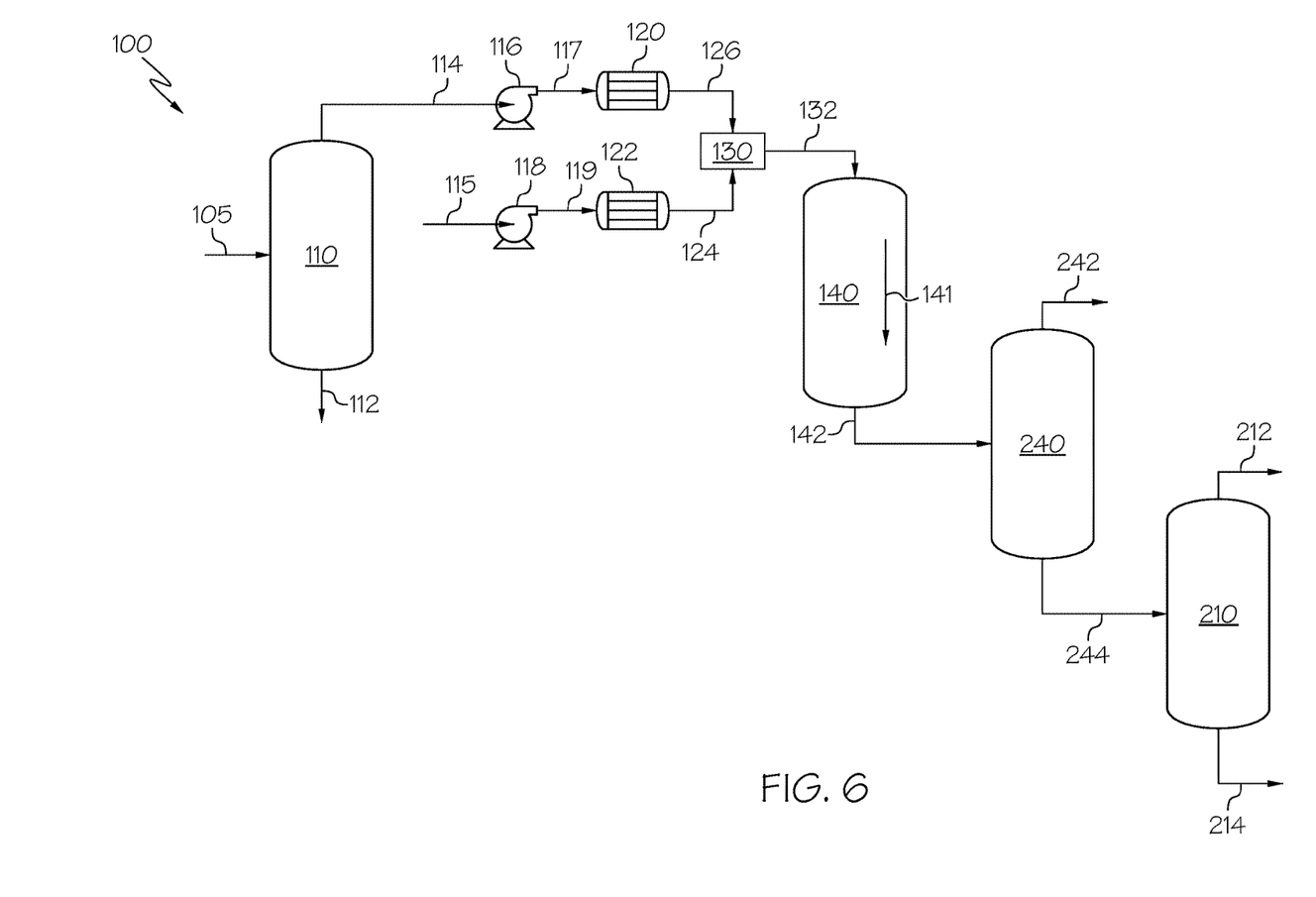
FIG. 6 is a schematic illustration of a system for producing high grade coke using supercritical water upgrading and a delayed coker in accordance with one or more embodiments of the present disclosure.

In another embodiment as shown in FIG. 6, a delayed coker 240 may be disposed upstream of the calciner 210. As shown, the delayed coker 240 may separate the output stream 142 of the upgrading reactor 140 into an upgraded gas-liquid-oil stream 242 which is passed out of the top of the delayed coker 240, while the slurry mixture 244 is passed out of the bottom of the delayed coker 240.

In addition to the production of high grade coke product stream 214, further separation operations may also be conducted for the upgraded product, which is a gas-liquid oil-water stream produced by the supercritical upgrading processes. Referring to FIG. 2, the upgraded product stream 146 may be cooled in a cooler 160 to yield a cooled upgraded product 162 having a temperature less than 200° C. Various cooling devices are contemplated for the cooler 160, such as a heat exchanger. Next, the pressure of the cooled upgraded product 162 may be reduced to create a depressurized, cooled upgraded product 172 with a pressure from 0.05 MPa to 2.2 MPa. The depressurizing can be achieved by many devices, for example, a valve 170, as shown in FIG. 2.

The depressurized, cooled upgraded product 172 may then be fed to a gas-liquid separator 180 to separate the depressurized, cooled upgraded product 172 into a gas-phase stream 182, which is passed out of the top of the gas-liquid separator 180, and a liquid-phase stream 184 The liquid-phase stream 184 may comprise water, short chain aromatics, and paraffins. Various gas-liquid separators are contemplated, for example, a flash drum.

The liquid-phase stream 184 may then be fed to an oil-water separator 190 to separate the liquid-phase stream 184 into a water-containing stream 192 and an oil-containing stream 194, where the oil-containing stream 194 comprises paraffins and short chain aromatics. Various oil-liquid separators are contemplated, for example, a centrifugal oil-gas separator.

EXAMPLE

The following experimental example is a simulation that utilizes the system depicted in FIG. 4, where stream properties and stream compositions are listed in the tables as follows. Referring to FIG. 4, Table 2 includes data regarding the crude oil residue 105 which is fed to the asphaltene separator, solvent extraction unit 110.

TABLE 2

Atmospheric Crude Oil Residue - Stream 105

| Feeding Rate | 100 kilograms per hour (kg/hr) |
|---|---|
| API Gravity | 3.5° API |
| Sulfur | 5.4 wt % |
| Nickel | 42 wt ppm |
| Vanadium | 134 wt ppm |
| CCR | 24 wt % |
| $C_7$-Asphalthene | 10 wt % |

Table 3, as follows, includes stream properties and stream compositions for the DAO-containing stream 114, which was passed out of the asphaltene separator, solvent extraction unit 110. In this case, the ASP separator was operated to produce about 71 wt % DAO-containing fraction to reduce sulfur and metal contents. In other instances, the DAO yield may be set to around 40 wt % to have metal contents (Ni+V) removal of about 95%. Thus, ASP separator was operated in very mild condition, where there is less rejection of asphaltene.

TABLE 3

DAO-containing stream - Stream 114

| Flow rate | 71 kg/hr |
|---|---|
| API Gravity | 6.3° API |
| Sulfur | 3 wt % |
| Nickel | 7 wt ppm |
| Vanadium | 16 wt ppm |
| CCR | 6 wt % |
| $C_7$-Asphalthene | 1 wt % |

Referring to FIG. 4, the water stream 115 was pumped to 27 MPa at a flow rate of 0.2 kg/hr and then pre-heated to 400° C. to yield supercritical water stream 124. The DAO-containing stream 114 was pumped to 27 MPa at a flow rate of 0.1 kg/hr and then pre-heated to 120° C. to yield a pressurized, heated DAO-containing stream 126. As show in FIG. 4, the supercritical water stream 124 and the pressurized, heated DAO-containing stream 126 were combined by a simple tee fitting mixer 130 to yield combined feed stream 132. The combined feed stream 132 was fed to a downflow upgrading reactor 140 having a 160 milliliter (mL) internal volume. The internal stream temperature and reactor inner wall temperature were measured by thermocouples. The heater surrounding the upgrading reactor 140 maintained the reactor wall temperature at a temperature of 460° C. The reactor internal stream temperature was 430° C. The upgrading reactor output stream 142 was cooled to 200° C. by double pipe type heat exchanger cooling unit 150 where tap water was used as coolant. The cooled output stream 152 was passed to a CSTR type vessel subcritical separator 260 of 500 ml internal volume. The CSTR temperature was adjusted to be 180° C. by a heater and cooling coil. The CSTR subcritical separator 260 discharged the slurry mixture stream 261 from the bottom of the CSTR subcritical separator 260 through valve 163.

The upgraded product stream 262, which is discharged from the top of the CSTR subcritical separator 260 was reduced to atmospheric pressure by pressure control valve 170. The properties of liquid oil from this upgraded product stream 262 are provided in Table 4 as follows. The effluent from the valve was separated into gas, liquid oil, and water by the gas-liquid separator 180 and the oil-water separator 190.

TABLE 4

Upgraded Product Stream 262

| Flow rate | 0.08 kg/hr |
|---|---|
| API Gravity | 16° API |
| Sulfur | 2.5 wt % |
| Nickel | <1 wt ppm |
| Vanadium | <1 wt ppm |
| CCR | 1 wt % |
| $C_7$-Asphalthene | <0.1 wt % |

Referring again to FIG. 4, the depressurized slurry mixture 164 contained water (around 50 wt %), which was removed by a centrifuge 200 to produce the dried slurry mixture 204. The dried slurry mixture 204 included about 20 wt % of DAO. The properties of this dried slurry mixture 204 is provided in Table 5 as follows.

TABLE 5

Dried Slurry Mixture 204

| Flow rate | 0.02 kg/hr |
|---|---|
| Sulfur | 2.1 wt % |
| Nickel | 6 wt ppm |
| Vanadium | 10 wt ppm |

The dried slurry mixture 204 was passed to a calciner 210 where it was calcined at 1,100° C. under flowing nitrogen to yield a stream comprising high grade coke product stream 214. The properties of this high grade coke product stream 214 are provided in Table 6 as follows.

TABLE 6

High Grade Coke - Stream 214

| Sulfur | 1.8 wt % |
|---|---|
| Nickel | 8 wt ppm |
| Vanadium | 12 wt ppm |

It should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A process for producing high grade coke from crude oil residue comprising:
   at least partially separating, in a solvent extraction unit, the crude oil residue into a deasphalted oil (DAO)-containing stream and an asphaltene containing-stream;
   producing a pressurized, heated DAO-containing stream by pressurizing and heating the DAO-containing stream, where the pressurized, heated DAO-containing stream is at a temperature greater than 75° C., and a pressure greater than a critical pressure of water;
   mixing a supercritical water stream with the pressurized, heated DAO-containing stream to create a combined feed stream, where the supercritical water stream has a pressure greater than the critical pressure of water and a temperature greater than a critical temperature of water;

introducing the combined feed stream to an upgrading reactor system comprising one or more upgrading reactors operating at a temperature greater than the critical temperature of water and a pressure greater than the critical pressure of water to yield one or more upgrading reactor output streams comprising upgraded product and a slurry mixture, where the slurry mixture comprises sulfur and one or more additional metals; and calcining the slurry mixture at a temperature of from 700° C. to 1900° C. to produce a product stream comprising the high grade coke.

2. The process of claim 1, where the upgrading reactor system yields one upgrading reactor output stream comprising upgraded product and the slurry mixture.

3. The process of claim 1, where the upgrading reactor system yields at least two upgrading reactor output streams such that the upgraded product and the slurry mixture are transferred from the upgrading reactor system in separate streams.

4. The process of claim 1, where the upgraded product is a gas-liquid-oil stream.

5. The process of claim 1, further comprising drying the slurry mixture in a centrifuge upstream of the calcining step.

6. The process of claim 1, further comprising passing the slurry mixture, the upgrading reactor output stream, or both to a subcritical separator upstream of the calcining step.

7. The process of claim 6, further comprising cooling the slurry mixture, the upgraded product, or both to a temperature of 200° C. or less prior to delivery to the subcritical separator.

8. The process of claim 6, where the subcritical separator is a continuous stirred tank reactor.

9. The process of claim 1, further comprising drying the slurry mixture in a centrifuge upstream of the calcining step.

10. The process of claim 1, further comprising delivering the slurry mixture to a supercritical $CO_2$ extractor upstream of the calcining step.

11. The process of claim 1, further comprising delivering the slurry mixture to a delayed coker unit upstream of the calcining step.

12. The process of claim 1, where the upgrading reactor system includes downflow reactors, upflow reactors, or combinations thereof.

13. The process of claim 1, where the upgrading reactor system lacks an external supply of hydrogen gas and a catalyst.

14. The process of claim 1, where the upgrading reactor system includes a first reactor and a second reactor downstream of the first reactor.

15. The process of claim 14, where the first reactor and the second reactor are isothermal or non-isothermal.

16. The process of claim 14, where the first reactor, the second reactor, or both include agitation or stirring devices.

17. The process of claim 14, where a ratio of a volume of the first reactor to a volume of the second reactor is 0.1:1 to 1:1.

18. The process of claim 14, where the ratio of the volume of the first reactor to the volume of the second reactor is 0.5:1 to 1:1.

19. The process of claim 1, where the crude oil residue comprises atmospheric residue, vacuum gas oil, or vacuum residue.

20. The process of claim 1, where the DAO-containing stream includes less than 30 wt % of aromatics.

* * * * *